Feb. 7, 1933.                F. L. SCOTT                 1,896,251
                         CUTTER FOR WELL DRILLS
                          Filed Dec. 20, 1929

FLOYD L. SCOTT  INVENTOR
BY  Jesse R. Stone
                   ATTORNEY

Patented Feb. 7, 1933

1,896,251

UNITED STATES PATENT OFFICE

FLOYD L. SCOTT, OF HOUSTON, TEXAS

CUTTER FOR WELL DRILLS

Application filed December 20, 1929. Serial No. 415,489.

My invention relates to rolling cutters employed on drills in the drilling of deep wells for water, oil, gas and the like. The invention has particular application to the formation of teeth upon the cutters of well drills of the roller type.

While drilling in hard or semihard formation with roller well drills, the cutters are rolled around upon the bottom of the hole, and the teeth tend to form indentations in the rock. In some formations these indentations are gradually deepened and act about like gear teeth. The teeth upon the cutters engage therein and intermesh with these indentations about like the teeth of gears. The teeth of the cutters track at each rotation of the bit in the notches or indentations cut by the teeth in the previous rounds upon the formation, and little progress is made.

The lack of progress in some formations is due to the fact that particles of the disintegrated material are packed tightly between the teeth of the cutter by the projecting "teeth" in the rock, and this material engages with said projecting ridges of material on the well bottom, and prevents the cutter teeth from penetrating. This is particularly true of the outer rows of teeth on the cutters, where the teeth are relatively wider and larger.

It is an object of the invention to form the teeth upon the outer surface of the cutters so that they will not track, or tend to fit within indentations cut by the teeth in the previous passage of the cutters over the bottom of the hole.

I desire to form the cutting teeth of large and uniform size, but I arrange to space the teeth on certain sectors of the circumference of each cutter from the teeth on other similar sectors so that the said teeth will, in effect, get out of step with other similar teeth, and thus prevent the teeth from tracking, and eliminate the cutting of gear teeth on the bottom of the hole.

I aim to cut the teeth upon the cutters in groups. The teeth in each group have approximately uniform size or pitch, but the groups are spaced from others in the same row, said spacing being some fraction of the pitch of the teeth in a given group. The teeth, therefore, cannot slide into the tracks made in the formation in previous rounds of the cutters.

In the drawing herewith I have shown in Fig. 1 a cutter of approximately conical form, the teeth upon which have been formed in accordance with my invention.

Figure 1:
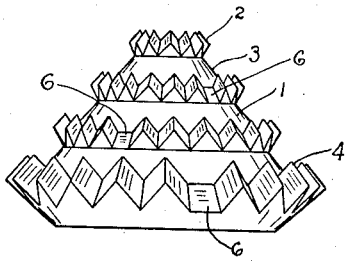

In the drawing I have illustrated the invention as applied to a cutter of ordinary shape such as employed upon hard formation well drills. The cutter body 1 has formed thereon a series of circumferential rows of teeth spaced apart to provide grooves or blank areas 3 between adjacent rows. The teeth 2 are arranged with cutting edges of chisel form with the crests extending longitudinally of the conical surface of the cutter body, although the invention may be applied to teeth otherwise arranged.

It will be seen that, as this cutter is rolled about the bottom of the hole with the larger circumference adjacent the outer wall of the hole, the teeth will be presented downwardly on the well bottom so as to cut indentations, which may be angularly disposed or radial relative to the axial center of said well bottom. As previously noted, the teeth on a cutter of common construction, on each successive round will tend to fit within the tracks or indentations already cut by prior contact of the teeth therewith.

Figure 2:
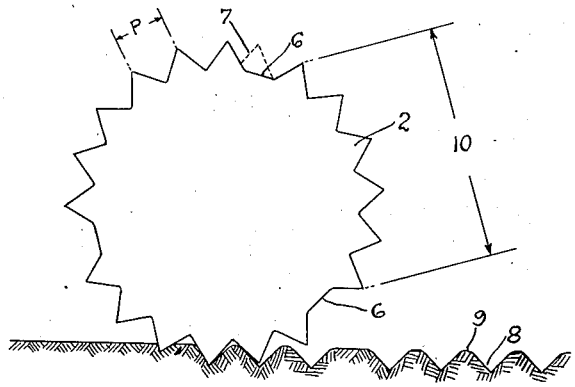
Fig. 2 is a diagrammatic view showing how the teeth are spaced in such manner as not to track, the cutter being shown on its first round.
Figure 3:
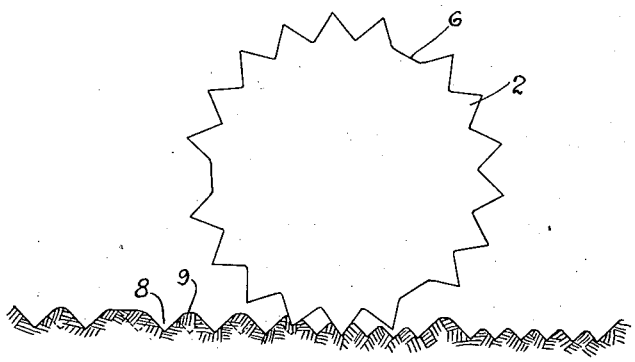
Fig. 3 illustrates the cutting of the bottom of the hole upon the second round.

To prevent the tracking of the teeth, I divide the circumference of each row of teeth into a plurality of groups or sectors 10. In Figs. 2 and 3 I have shown three separate sectors, the teeth on which are of uniform pitch P, as indicated in Fig. 1. Each sector in a given row is spaced slightly from its adjacent sector on the same row of teeth by a distance indicated at 6 which is greater or less than pitch P. The space 6 may be shorter or longer than the pitch of a tooth as is indicated at 7 in Fig. 2. There is a tendency of the teeth to slide while rotating so that the teeth on the cutter will move into and track with the indentations previously cut upon the bottom, even though the teeth are not of equal size or are unequally spaced. I therefore regulate the width of the space 6 so that the teeth on one sector will strike the ridges between indentations on the bottom, or upon the crests of said ridges, and thus effectively cut into the same and flatten out the said ridges. The formation of rock gear teeth upon the bottom of the hole will be thus prevented.

While I have shown the teeth of each circumferential row as divided into a plurality of offset sectors, it is of course possible to use only one set of teeth equally spaced except at one point where there is a break in the row of sufficent width to throw the teeth of the cutter on their second rotation out of step with the tracks cut by them on the first rotation. By the phrase "out of step" as used herein, is meant the positioning of the sets of teeth in each row upon the cutter so that the imprints of one set of teeth upon the well bottom will not coincide with the imprints of adjacent sets of teeth in the same row.

Figs. 2 and 3 illustrate the action of the cutters upon the formation. It will be noted that when the cutter teeth penetrate the rock, they leave imprints or indentations 8 in the same with ridges or "gear teeth" 9 between them. Where the cutter teeth are uniformly spaced about the entire circumference of the cone, they will tend to track in the indentations previously made, on each rotation of the drill, and this will occur even though the teeth do not start their second round of the hole in the same phase; that is, even though the teeth are out of step at the start of the second round, they will work back into the indentations previously made and fall into step very quickly.

By spacing the teeth on one sector of each cutter from the teeth on adjacent sectors a distance equal to a fraction of "P", I can bring the imprints of teeth of each sector out of step with the imprints of adjacent sets of teeth in the same row upon the bottom of the hole so that the teeth of the cutter on its second round fail to register with the imprints of other sets of teeth and said teeth will engage on the ridges on the well bottom, and will thus bite into and disintegrate said ridges, and prevent the formation of rock gear teeth. The cutter teeth will be free to penetrate the formation and expedite the cutting of the bottom of the hole.

The hole will thus be drilled at uniform speed, because the teeth will not be cemented full of the finely disintegrated rock or other similar material.

When my invention is applied to conical shaped cutters such as are illustrated in Fig. 1, I stagger the spaces 6 longitudinally of the cutter so that the teeth 2 in one row are not aligned with similar teeth in adjacent rows. I thus further avoid any tendency of the teeth on one row to slip into the indentations previously formed, as the teeth on the adjacent rows will be in a different phase and will act to prevent such slipping. Also the cutter will run more smoothly as the teeth are not aligned longitudinally and the crests of no two teeth in different rows will be in direct cutting contact with the bottom of the hole at the same time. The teeth will also penetrate better, as there are fewer teeth on each cutter at each instant of time, to take the load of the drill resting on the bit.

The invention is not confined to the forming of teeth on conical shaped cutters, however, but is to be understood as applicable to roller cutters of all types.

When the teeth are formed on cutters according to my invention, a faster and more uniform cutting action is obtained, without regard to the particular shape of the cutter.

What I claim as new is:

1. A cutter for roller well drills, cutting teeth formed in circumferential rows on the periphery thereof, said teeth in each row being of uniform pitch but formed in sets on adjacent sectors of the circumference of the cutter, each set being spaced from adjacent sets in the same row a distance unequal to the pitch of one of the teeth.

2. A cutter for roller well drills, cutting teeth formed in circumferential rows on the periphery thereof, said teeth in each row being of uniform size but formed in sets on adjacent sectors of the circumference of the cutter, each set being spaced from adjacent sets in the same row a distance less than the pitch of one of the teeth.

3. A cutter for roller well drills, cutting teeth formed in circumferential rows on the periphery thereof, said teeth being of uniform size but formed in sets on adjacent sectors of the circumference of the cutter, the teeth of each set being out of step with the adjacent set on a given row so that they will not track in indentations cut by the teeth in previous rounds.

4. A cutter for roller well drills comprising an approximately conical shaped body, teeth thereon formed in circumferential rows, the teeth in each row being formed into a plurality of sets, each set being out of step with others on adjacent sectors in the same row about the circumference of the cutter for the purpose described.

5. A cutter for roller well drills comprising an approximately conical shaped body, teeth thereon formed in circumferential rows, the teeth in each row being formed into a plurality of sets, each set being spaced from adjacent sets a distance which will place it out of step therewith, so that the teeth will not tend to track in the indentations cut by the cutter in its preceding round.

6. A cutter for roller well drills, teeth of chisel shape thereon with the crests thereof longitudinally of the cutter, said teeth being in a circumferential row and formed in sets, each set being spaced from the teeth of adjacent sectors of the row to place the teeth of one set out of step with those of adjacent sets.

7. A cutter for roller well drills, teeth thereon formed in circumferential rows, the teeth in each row being formed in a plurality of sets, each set being all of the same pitch and spaced from an adjacent set in the same row by a blank space the width of a distance which is a fraction of the pitch of one tooth, the spaces between adjacent sets of teeth being out of alignment with the similar spaces in adjacent rows longitudinally of the cutter.

8. A cutter for roller well drills comprising an approximately conical shaped body, teeth thereon formed in circumferential rows, the teeth in each row formed in a plurality of sets each set having the same pitch, each set being spaced from adjacent sets in the same row a distance which is a fraction of the pitch of one tooth, the spaces between adjacent sets of teeth in the same row being out of alignment with the similar spaces in adjacent rows longitudinally of the cutter.

In testimony whereof, I hereunto affix my signature, this the 11th day of December, A. D. 1929.

FLOYD L. SCOTT.